United States Patent Office 3,290,295
Patented Dec. 6, 1966

3,290,295
17-OXYGENATED 2α,3α-EPOXY-2β-FORMYL-5α-ANDROSTANES AND INTERMEDIATES THERETO
Paul D. Klimstra, Northbrook, and Raymond E. Counsell, Skokie, Ill., assignors to G. D. Searle & Co., Chicago, Ill., a corporation of Delaware
No Drawing. Filed Mar. 14, 1963, Ser. No. 265,282
6 Claims. (Cl. 260—239.55)

This application is a continuation-in-part of our copending application, Serial No. 218,440, filed August 21, 1962, now U.S. Patent No. 3,238,233.

The present invention is concerned with steroidal epoxy aldehydes and, more particularly, with 17-oxygeneated 2α,3α-epoxy-2β-formyl-5α-androstanes of the structural formula

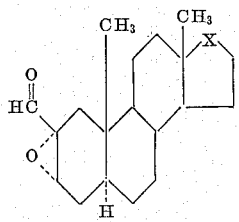

wherein X is a carbonyl, β-hydroxymethylene, or β-(lower alkanoyl)oxymethylene radical. The lower alkanoyl radicals encompassed in the X term are exemplified by acetyl, propionyl, butyryl, valeryl, caproyl, and the branched-chain isomers thereof.

Included also in this invention are novel 5α-androst-2-enes useful as intermediates in the manufacture of the above-described compounds. These novel intermediates are represented by the structural formula

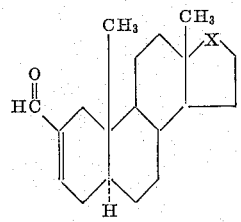

wherein X can be a carbonyl or β-acetoxymethylene group. They possess also useful pharmacological properties, i.e., anabolic, androgenic, and hypocholesterolemic.

The novel 17-oxygenated 2α,3α-epoxy-2β-formyl-5α-androstanes of this invention can be prepared by epoxidation of the corresponding 17-oxygenated 2-formyl-5α-androst-2-enes. This reaction is suitably conducted at or near room temperature in a polar organic solvent medium using, for example, alkaline hydrogen peroxide as the reagent. Instead of that reagent, however, other epoxidizing agents such as peracetic acid or perbenzoic acid may be utilized. This epoxidation process is specifically illustrated by the reaction of 2-formyl-5α-androst-2-en-17β-ol 17-acetate in methanol with 30% aqueous hydrogen peroxide and 10% methanolic sodium hydroxide to produce 2α,3α-epoxy-2β-formyl-5α-androstan-17β-ol 17-acetate.

The intermediate 17-oxygenated 2-formyl-5α-androst-2-enes are conveniently manufactured by utilizing as the starting material, 17β-hydroxy-2-methoxymethylene-5α-androstan-3-one, described by R. O. Clinton et al., J. Am. Chem. Soc., 83, 1478 (1961). Reduction of the 3-keto group of the latter substance by reaction with a suitable reagent affords the corresponding 3β-ol. That substance is contacted with a lower alkanoic acid anhydride in the presence of a suitable acid acceptor at room temperature to yield the 2-formyl-5α-androst-2-en-17β-ol 17-(lower alkanoate). This sequence is exemplified by reaction of the aforementioned 17β-hydroxy-2-methoxymethylene-5α-androstan-3-one with lithium aluminum hydride in tetrahydrofuran at the reflux temperature, resulting in 2-methoxymethylene-5α-androstane-3β,17β-diol, followed by reaction of that diol with acetic anhydride and pyridine at room temperature to produce the aforementioned 2-formyl-5α-androst-2-en-17β-ol 17-acetate. This acetate can be prepared, alternatively, by the lithium aluminum hydride reduction of 17β-hydroxy-2-hydroxymethylene-5α-androstan-3-one, as is described in our copending application Serial No. 218,440, filed August 21, 1962. Hydrolysis of the latter acetate, suitably by heating in ethanol with aqueous potassium hydroxide, affords 2-formyl-5α-androst-2-en-17β-ol, which substance can be oxidized, typically with chromic acid, to yield 2-formyl-5α-androst-2-en-17-one. The latter two intermediates can be epoxidized by the process described above, resulting in the corresponding 2α,3α-epoxides of the present invention.

The 2α,3α-epoxy compounds of the present invention are useful as a consequence of their valuable pharmacological properties. They are, for example, hormonal agents as is evidenced by their anabolic, androgenic, antiestrogenic, and progestational properties.

The invention will appear more fully from the examples which follow. These examples are set forth by way of illustration only, and it will be understood that the invention is not to be construed as limited in spirit or in scope by the details contained therein, as many modifications in materials and methods will be apparent from this disclosure to those skilled in the art. In these examples, temperatures are given in degrees centigrade (0 C.). Quantities of materials are expressed in parts by weight except where otherwise noted.

*Example 1*

A suspension of 10 parts of 17β-hydroxy-2-methoxymethylene-5α-androstan-3-one in 133 parts of tetrahydrofuran is stirred in a nitrogen atmosphere, and a solution of 2 parts of lithium aluminum hydride in 98 parts of tetrahydrofuran is added over a period of about one hour. This reaction mixture is heated at the reflux temperature for about 5 hours, then is allowed to stand at room temperature for about 16 hours. The excess lithium aluminum hydride is destroyed by the addition of 13.5 parts of ethyl acetate at which time 20 parts by volume of concentrated aqueous sodium sulfate is added. The resulting mixture is stirred until the color of the lithium salts changes from gray to white. Approximately 4 parts of sodium sulfate is added, and this mixture is stirred, filtered, and the filter cake is washed with tetrahydrofuran. Removal of the solvent from the filtrate by distillation at reduced pressure affords the solid 2-methoxymethylene-5α-androstane-3β,17β-diol. It is characterized by infrared maxima at about 2.75, 3.4, 5.95, 8.83, and 9.47 microns.

The solid 2-methoxymethylene-5α-androstane-3β,17β-diol is mixed with 90 parts of acetic anhydride and 180 parts of pyridine in a nitrogen atmosphere, and the resulting mixture is kept at room temperature for about 16 hours, then is poured slowly into approximately 1500 parts of an ice and water mixture. The resulting oily precipitate which forms is extracted into ether, and the ether solution is washed successively with 10% hydrochloric acid, 5% aqueous sodium bicarbonate, and water. The washed solution is dried over anhydrous potassium carbonate containing decolorizing carbon, then is concentrated at reduced pressure to afford the crude product as a white solid. This solid is purified by adsorption on a silica gel chromatographic column, followed by elution with 5% ethyl acetate in benzene and recrystallization from methanol, resulting in 2-formyl-5α-androst-2-en-17β-ol 17-acetate, melting at about 169–171° and characterized further by an optical rotation of +42°. It displays infrared absorption maxima at about 3.4, 3.65, 5.77, 5.93, 6.07, 7.93, and also an ultraviolet absorption maximum at about 231 millimicrons with a molecular extinction coefficient of about 9700. This compound is represented by the formula

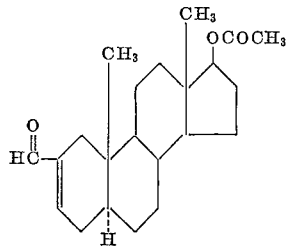

*Example 2*

The substitution of 115 parts of propionic anhydride in the procedure described in Example 1 results in 2-formyl-5α-androst-2-en-17β-ol 17-propionate.

*Example 3*

To a solution of 2.4 parts of 2-formyl-5α-androst-2-en-17β-ol 17-acetate in 100 parts of ethanol is added a solution of 2 parts of potassium hydroxide in 10 parts of water, and the resulting reaction mixture is heated at the reflux temperature for about 10 minutes, then is cooled and poured slowly into water. The resulting precipitate is collected by filtration and is recrystallized from methanol to yield pure 2-formyl-5α-androst-2-en-17β-ol, melting at about 192–196° and characterized further by the formula

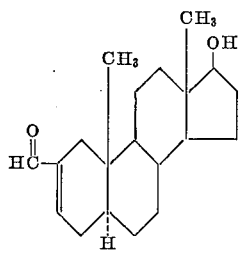

*Example 4*

To a solution of 6 parts of 2-formyl-5α-androst-2-en-17β-ol in 320 parts of acetone is added an aqueous solution, 8 N in chromium trioxide and 8 N in sulfuric acid, until a slight excess of the oxidant is present. The reaction mixture is filtered, and the filter cake is washed with acetone. Removal of the solvent from the filtrate by distillation in vacuo affords a white solid which is purified by recrystallization from aqueous methanol to produce 2-formyl-5α-androst-2-en-17-one, melting at about 147–149°. It is characterized further by an ultraviolet absorption maximum at about 231 millimicrons with a molecular extinction coefficient of about 12,300 and also by the formula

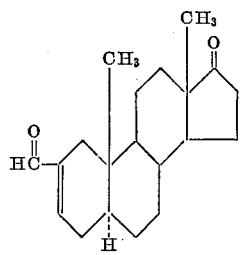

*Example 5*

To a solution of 1.5 parts of 2-formyl-5α-androst-2-en-17β-ol 17-acetate in 40 parts of methanol is added successively 1.5 parts by volume of 30% aqueous hydrogen peroxide and 0.4 part by volume of 10% sodium hydroxide in methanol. The reaction mixture is kept at room temperature for about one hour, then is diluted with water to the point of turbidity. Cooling in an ice bath results in precipitation of the product which is collected by filtration and washed with water, then dried. Recrystallization from aqueous methanol yields pure 2α,3α-epoxy-2β-formyl-5α-androstan-17β-ol 17-acetate, which melts at about 178°. Infrared absorption maxima are exhibited at about 3.4, 3.65, 5.77, and 7.95 microns. This compound is represented by the structural formula

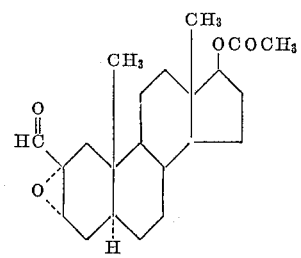

*Example 6*

By substituting 1.56 parts of 2-formyl-5α-androst-2-en-17β-ol 17-propionate in the procedure of Example 5, 2α,3α-epoxy-2-formyl-5α-androstan-17β-ol 17-propionate is obtained.

*Example 7*

To a solution of 5 parts of 2-formyl-5α-androst-2-en-17β-ol in 160 parts of methanol, at room temperature with stirring, is added successively 5 parts by volume of 30% hydrogen peroxide and 1.4 parts by volume of a 10% methanolic solution of sodium hydroxide. The resulting solution is kept at room temperature for about one hour, then is poured into a mixture of ice and water. The precipitate which forms is collected by filtration, washed with water, and dried in air. Recrystallization from aqueous methanol yields pure 2α,3α-epoxy-2-formyl-5α-androstan-17β-ol which melts at about 112–115°. It is characterized further by infrared absorption maxima at about 2.75, 3.4, 3.65, and 5.78 microns and also by the formula

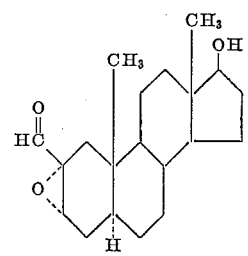

*Example 8*

To a solution of 2.5 parts of 2-formyl-5α-androst-2-en-17-one in 80 parts of methanol is added successively 2.5 parts by volume of 30% aqueous hydrogen peroxide and 0.8 part by volume of 10% sodium hydroxide in methanol. The resulting reaction mixture is warmed on the steam bath for about 30 minutes, then is poured carefully into water. Extraction of the aqueous mixture with ether affords an organic solution which is washed with water, then dried over anhydrous potassium carbonate containing decolorizing carbon. The solution is concentrated by distillization at reduced pressure to afford 2α,3α-epoxy-2-formyl-5α-androstan-17-one as an oil. It is characterized further by infrared absorption maxima at about 3.4, 3.65, and 5.77 microns, and is represented by the structural formula

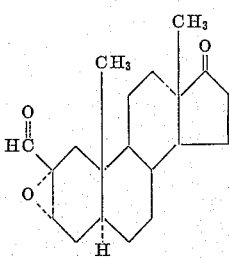

What is claimed is:
1. A compound of the formula

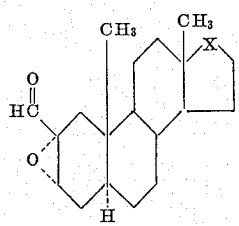

wherein X is selected from the group consisting of carbonyl, β-hydroxymethylene, and β-(lower alkanoyl)oxymethylene radicals.

2. 2α,3α-epoxy-2β-formyl-5-α-androstan-17-one.
3. 2α,3α-epoxy-2β-formyl-5α-androstan-17β-ol.
4. A compound of the formula

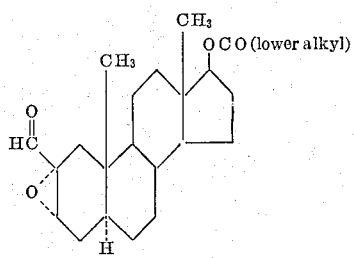

5. 2α,3α-epoxy-2β-formyl-5α-androstan-17β-ol 17-acetate.
6. 2-formyl-5α-androst-2-en-17-one.

References Cited by the Examiner
UNITED STATES PATENTS

| | | | |
|---|---|---|---|
| 3,077,485 | 2/1963 | Bowers et al. | 260—397.4 |
| 3,080,398 | 3/1963 | Bowers et al. | 260—397.4 |

LEWIS GOTTS, *Primary Examiner.*

E. ROBERTS, *Assistant Examiner.*